Nov. 15, 1932.  I. G. ROBINSON  1,887,720

TOOTH PASTE AND SHAVING CREAM TUBE HOLDER

Filed April 17, 1931  2 Sheets-Sheet 1

Inventor
Irving L. Robinson

Nov. 15, 1932.  I. G. ROBINSON  1,887,720
TOOTH PASTE AND SHAVING CREAM TUBE HOLDER
Filed April 17, 1931  2 Sheets-Sheet 2
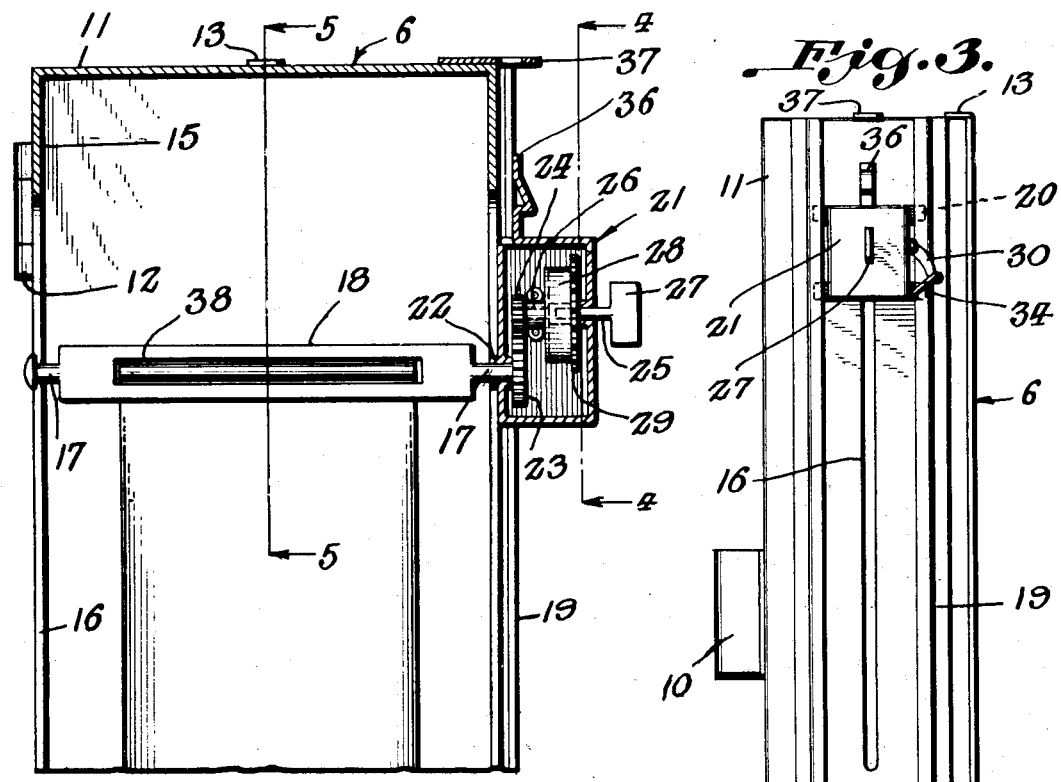
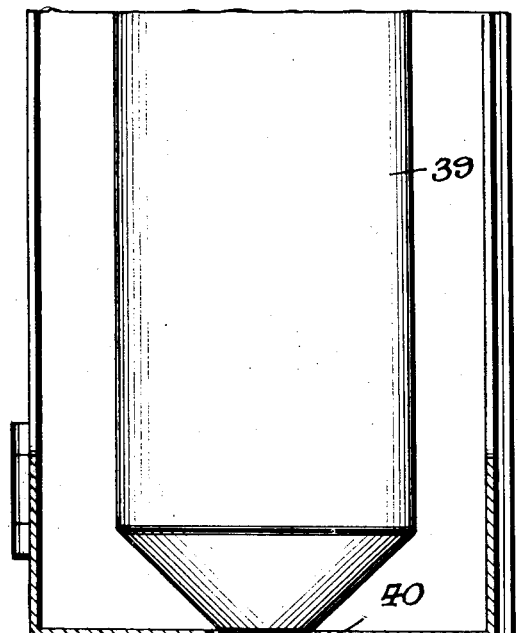
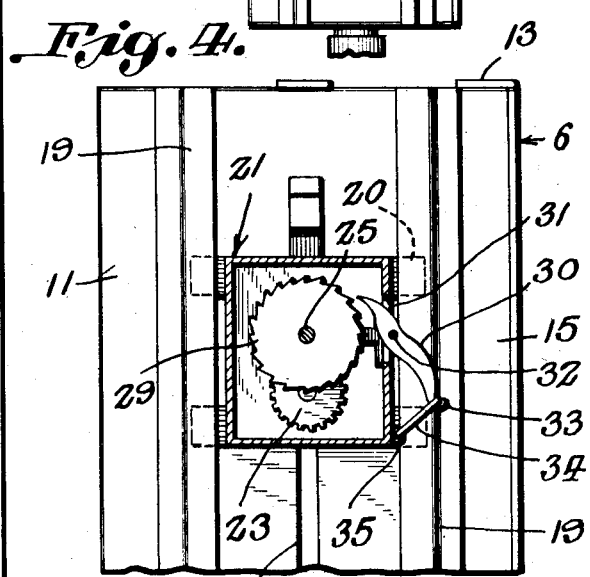
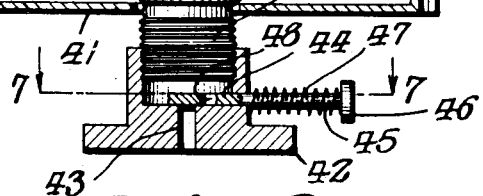
Inventor
Irving G. Robinson Patented Nov. 15, 1932

1,887,720

UNITED STATES PATENT OFFICE

IRVING G. ROBINSON, OF NORWALK, CONNECTICUT

TOOTH PASTE AND SHAVING CREAM TUBE HOLDER

Application filed April 17, 1931. Serial No. 530,870.

My invention relates to improvements in dispensers and more particularly to a device for automatically dispensing the contents of collapsible paste tubes.

The primary object of the invention is to provide a holder for collapsible paste tubes having means for exerting a constant pressure on the contents of the tube, so as to automatically discharge the contents therefrom.

A further object of the invention is to provide a device of the above-mentioned character having a manually controlled valve for regulating the discharge of paste from the tube.

Another object of the invention is to provide a device of the above-mentioned character which is simple and durable in construction, reliable and efficient in use and inexpensive to manufacture.

Other objects and advantages of the invention will be apparent during the course of the following description.

Figure 1:
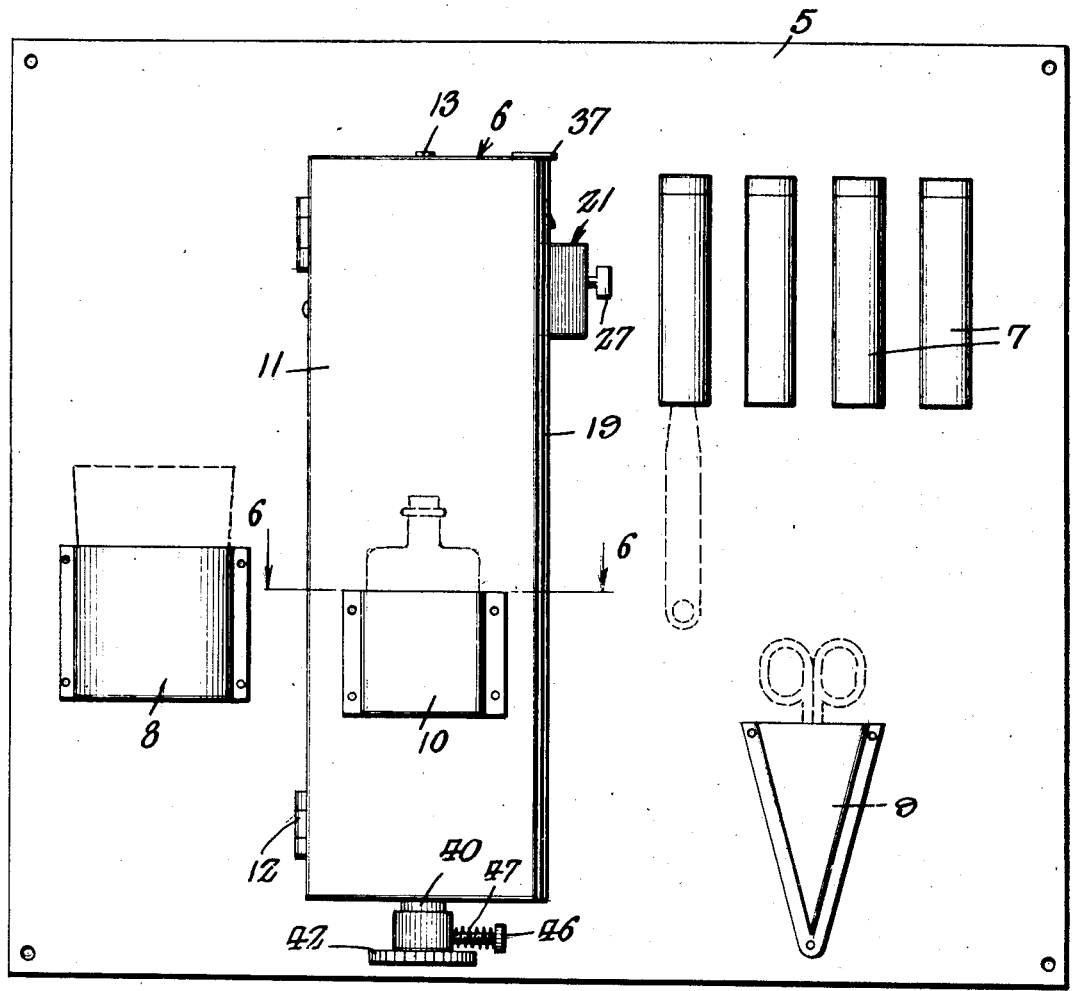
Figures 5, 6, 7:
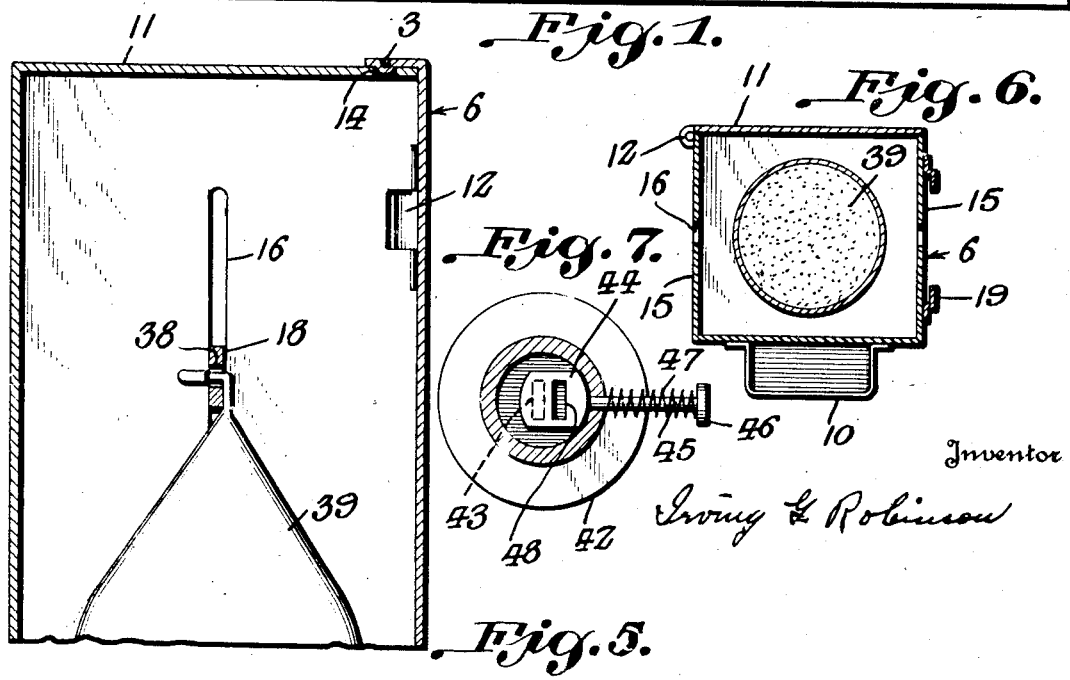

In the accompanying drawings, forming a part of this specification and in which like numerals are employed to designate like parts throughout the same, Fig. 1 is a front elevation view of the dispenser, Fig. 2 is a longitudinal sectional view of the dispenser, Fig. 3 is a side view of the dispenser, Fig. 4 is a section taken on lines 4—4 of Fig. 2, Fig. 5 is a section taken on lines 5—5 of Fig. 2, Fig. 6 is a transverse section taken on lines 6—6 of Fig. 1, and Fig. 7 is a transverse section taken on lines 7—7 of Fig. 2.

In the drawings, wherein for the purpose of illustration I have shown a preferred embodiment of my invention, the numeral 5 denotes a base plate, adapted to be attached to a wall and on which is mounted the dispenser 6. The base plate is also provided with holders for various toilet articles, such as toothbrush holders 7, glass holder 8, scissors holder 9 and a shaving lotion holder 10 is mounted on the front wall of the dispenser.

The dispenser consists of an elongated casing 11 attached at one side to the base plate 5, by hinges 12, the inner wall of the casing being open, so as to permit access to the interior of the casing, when the casing is swung outwardly from the base plate. A spring catch 13 projects from the base plate and is adapted to engage an aperture 14 in the top of the casing 11, to lock the casing in its closed position. The side walls 15 of the casing are provided with central longitudinal slots 16 adapted to slidably and rotatably receive the trunnions 17 extending from the ends of the coiler 18 which is transversely disposed within the casing. One of the side walls is provided with spaced longitudinal guide rails 19 disposed on opposite sides of he slot 16 adapted to slidably receive the arms 20 extending laterally from the sides of the spring housing 21 which is movable longitudinally of the casing. The inner wall of the housing 21 is provided with a bearing 22 through which one of the trunnions 17 of the coiler extends and mounted on the end of the trunnion within the housing is a gear wheel 23. The gear wheel 23 meshes with a smaller gear wheel 24 mounted on the inner end of the shaft 25 journaled in the bearing 26 attached to the side wall of the housing. The outer end of the shaft 25 extends through the front wall of the housing having a head 27 formed integral therewith for turning the shaft to wind the coil spring 28 mounted on the shaft. Attached to the coil spring 28 is a ratchet wheel 29, the teeth of the wheel being normally engaged by one end of the dog 30 which is pivotally mounted in the slot 31 in the side of the housing by the pivot pin 32. The opposite end of the dog extends beyond the housing and is provided with a hook 33 at its extremity adapted to be engaged by the loop 34 which has one end pivotally connected to the side of the housing, as at 35. A spring latch 36 extends upwardly from the top of the housing and is adapted to engage the catch 37 attached to the top of the casing, for releasably holding the housing at the top of the casing.

The coiler 18 is provided with a longitudinal slot 38 to receive the bottom end of the collapsible paste tube 39 which is inserted in the housing in an inverted position, the neck 40 of the tube extending through the opening 41 in the bottom end of the casing. A screw cap 42 is threaded on the end of the neck, the head of the cap being provided with a longitudinal slot 43 through which the paste is discharged. A valve plate 44 is disposed within the cap 42 in covering relation to the slot 43 and extending from one end of the valve plate is an operating arm 45 which projects through the side of the cap, having a head 46 at its end. A coil spring 47 is mounted on the arm 45 between the head 46 and screw cap, normally holding the valve plate in covering relation to the slot 43. Upon pressing the arm inwardly, the valve plate 44 is moved to bring the slot 48 through the valve plate, in registering relation with the slot 43, so as to permit the discharge of the paste therethrough.

To operate, the head 27 of the shaft 25 is turned winding the spring 28, which is prevented from unwinding by the dog 30 which engages the teeth of the ratchet wheel 29. The housing 21 is raised to the upper end of the casing 11 until the spring latch 36 engages the catch 37 and then the spring catch 13 is released and the casing swung outwardly to an open position. The tube of paste 39 is then inserted in the casing, the bottom of the tube being inserted in the slot 38 of the coiler 18, while the neck 40 of the tube is disposed in the opening 41 in the bottom of the casing. After mounting the tube in the casing, the casing is closed and the spring latch 36 released, so as to permit the housing 21 to move downwardly. The loop 34 is then engaged with the hooked end 33 of the dog, releasing the spring 28 which turns the shaft 25. The shaft 25 through the medium of the gear wheels 24 and 23 rotates the coiler 18, coiling the bottom end of the paste tube thereon, thereby exerting a constant pressure on the contents of the tube. The valve plate 44 in the screw cap 42 normally closes the discharge slot 43, but upon pressing the arm 45 to move the valve plate and bring the slot 48 into registering relation with the slot 43, the paste in the tube is automatically discharged through the slot 43. Upon release of the arm 45, the valve plate is returned to its normal position by the spring 47. To remove an empty tube from the casing, the screw cap 42 is removed, then the housing 21 is raised to the top of the casing and the neck 40 of the tube is grasped in one hand, while the spring 28 is re-wound with the other hand which uncoils the tube from the coiler 18.

It is to be understood that the form of my invention herewith shown and described is to be taken as a preferred example of the same and that certain changes in the shape, size and arrangement of the parts may be made without departing from the spirit of the invention or the scope of the subjoined claims.

Having thus described my invention, I claim:—

1. A paste tube dispenser comprising a casing, a coiler slidably mounted in said casing adapted to receive the end of a paste tube, spring mechanism slidably mounted on said casing, gearing connecting said spring mechanism with said coiler and a cut-off valve mounted on the neck of the paste tube.

2. A paste tube dispenser comprising a casing, a coiler slidably mounted in said casing adapted to receive the end of a paste tube, a housing slidably mounted on said casing, a spring mechanism mounted in said housing, gearing connecting said spring mechanism with said coiler, latch means for releasably holding said housing at the top of said casing and a cut-off valve mounted on the neck of the paste tube.

3. A paste tube dispenser comprising a casing, a coiler slidably mounted in said casing adapted to receive the end of a paste tube, a housing slidably mounted on said casing, a spring mechanism mounted in said housing, gearing connecting said spring mechanism with said coiler, a ratchet mechanism for controlling said spring mechanism and a cut-off valve mounted on the neck of the paste tube.

4. A paste tube dispenser comprising a casing, a compressor slidably mounted in said casing, adapted to receive the end of a paste tube, a motor slidably mounted on said casing and gearing operatively connecting said motor with said compressor, whereby a continuous torque is exerted by said motor on said compressor, so that when the closure of the paste tube is removed, a continuous rotary movement is imparted to said compressor.

5. A paste tube dispenser comprising a casing, a rotary compressor slidably mounted in said casing adapted to receive the end of a paste tube, a spring motor slidably mounted on said casing and gearing operatively connecting said motor with said compressor, whereby a continuous torque is exerted by said motor on said compressor, so that when the closure of the paste tube is removed, a continuous rotary movement is imparted to said compressor.

6. A paste tube dispenser comprising a casing, a rotary compressor slidably mounted in said casing, adapted to receive the end of a paste tube, the opposite end of the paste tube being connected to one end of said casing, a motor slidably mounted on said casing, and gearing operatively connecting said motor with said compressor, whereby a continuous torque is exerted by said motor on said compressor, so that when the closure of the paste tube is removed, a continuous rotary movement is imparted to said compressor.

7. A paste tube dispenser comprising a casing, a rotary compressor slidably mounted in said casing, adapted to receive the end of a paste tube, the discharge end of the paste tube being connected to one end of said casing, a cut-off valve mounted on the discharge end of the paste tube, a motor slidably mounted on said casing and gearing operatively connecting said motor with said compressor, whereby a continuous torque is exerted by said motor on said compressor, so that when said cut-off valve is opened, a continuous rotary movement is imparted to said compressor.

8. A paste tube dispenser comprising a casing, a rotary compressor slidably mounted in said casing adapted to receive the end of a paste tube, the discharge end of the tube being connected to one end of said casing, a motor slidably mounted on said casing, means operatively connecting said motor with said compressor, whereby a continuous torque is exerted by said motor on said compressor, so that when the closure of the paste tube is removed, a continuous rotary movement is imparted to said compressor and latch means for releasably holding said motor at the top of said casing.

9. A paste tube dispenser comprising a casing, a rotary compressor slidably mounted in said casing, adapted to receive the end of a paste tube, the discharge end of the tube being connected to one end of said casing, a cut-off valve mounted on the discharge end of the paste tube, a motor slidably mounted on said casing, gearing operatively connecting said motor with said compressor, whereby a continuous torque is exerted by said motor on said compressor, so that when said cut-off valve is opened, a continuous rotary movement is imparted to said compressor, and means for controlling said motor.

10. A paste tube dispenser comprising a casing, a rotary compressor slidably mounted in said casing, adapted to receive the end of a paste tube, the discharge end of the tube being connected to one end of said casing, a cut-off valve mounted on the discharge end of the tube, a spring motor slidably mounted on said casing, gearing connecting said motor with said compressor, whereby a continuous torque is exerted by said motor on said compressor, so that when said cut-off valve is opened, a continuous rotary movement is imparted to said compressor, latch means for releasably holding said motor at the top of said casing, and means for controlling said motor.

In testimony whereof I affix my signature.

IRVING G. ROBINSON.